(No Model.)
D. L. HOLDEN.
APPARATUS FOR PRODUCING ANHYDROUS AMMONIA.
No. 453,005. Patented May 26, 1891.
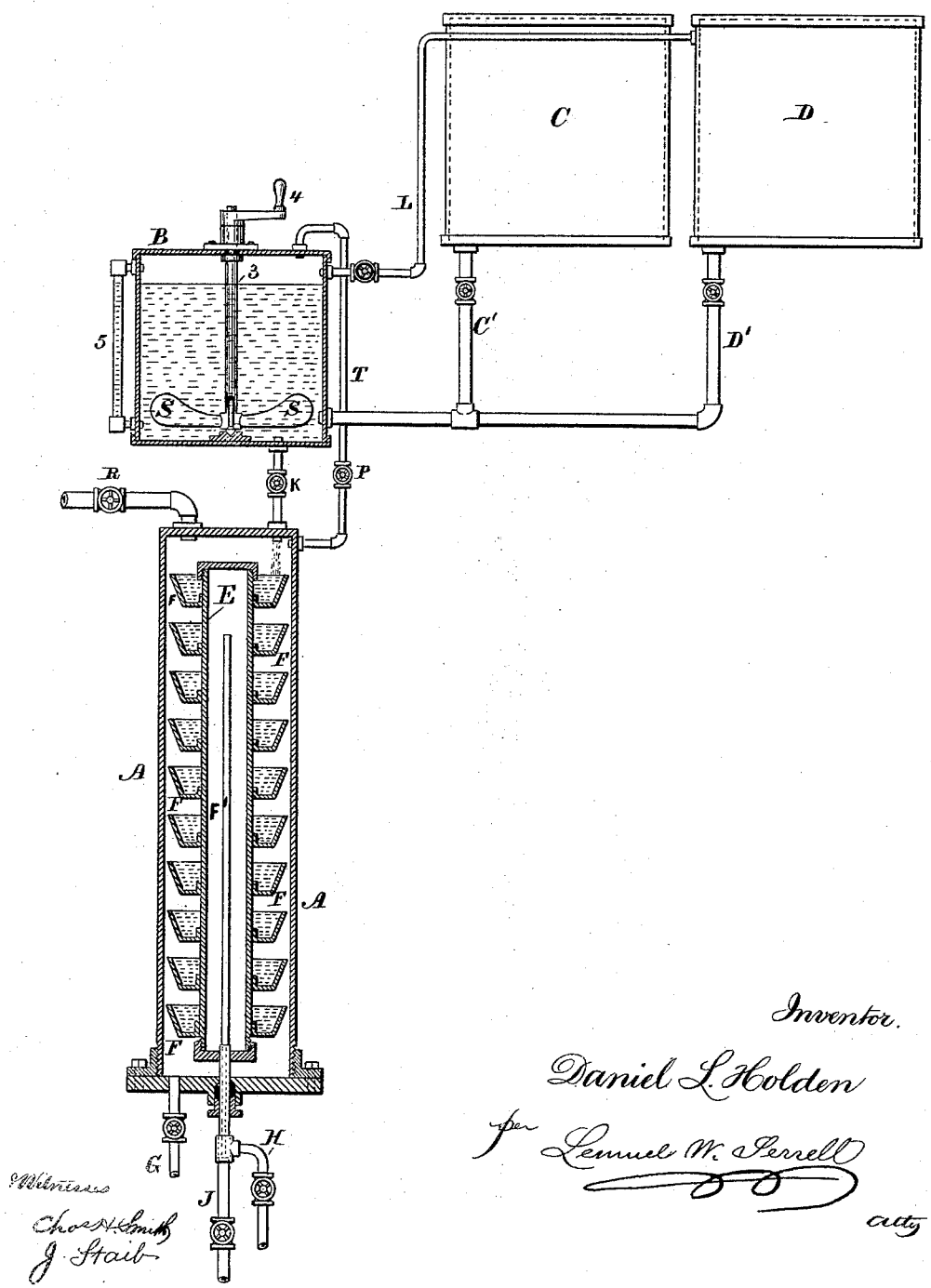

UNITED STATES PATENT OFFICE.

DANIEL L. HOLDEN, OF NEW YORK, N. Y.

APPARATUS FOR PRODUCING ANHYDROUS AMMONIA.

SPECIFICATION forming part of Letters Patent No. 453,005, dated May 26, 1891.

Application filed March 23, 1891. Serial No. 386,005. (No model.)

*To all whom it may concern:*

Be it known that I, DANIEL L. HOLDEN, a citizen of the United States, residing at the city, county, and State of New York, have invented an Improvement in the Manufacture of Anhydrous Ammonia for Ice and Refrigerating Machines, of which the following is a specification.

Gaseous ammonia has been made use of extensively in ice and refrigerating machines, and heretofore it has been usual to compress and liquify the ammonia and transport the same in closed metallic vessels to the refrigerating apparatus, and in many instances the refrigerating apparatus is employed in warm climates and the anhydrous liquid ammonia is exposed to high temperatures in transportation, and the holder is subjected to very heavy pressure, frequently causing the same to burst, thus greatly increasing the expense and risk in cooling and refrigerating apparatus.

The present invention relates to a cheap and convenient mode of manufacturing the anhydrous ammonia from the salts thereof. In this improvement saturated solutions of ammoniacal salt—such as sulphate of ammonia and caustic soda—are mixed together, and the gaseous ammonia is liberated from the solution and delivered directly to the refrigerating apparatus. By this improvement ammoniacal salt can be made use of in producing the ammonia for the refrigerating apparatus without the risk, expense, or delay attendant upon procuring the anhydrous ammonia in the liquid form and the cost is very much less.

In the drawing I have represented a vertical section of an apparatus adapted to the production of the anhydrous ammonia.

The vessel D is of a suitable size for the reception of a solution of sulphate of ammonia or equivalent salt and the vessel C for the reception of the solution of caustic soda or its equivalent. From these vessels C and D the pipes and cocks C' D' pass to a vessel B of suitable size and containing an agitator S, similar to a paddle or propeller-blade, the same being upon a vertical shaft 3, passing through the head of the vessel B and provided with a crank-handle or other device 4, by which the shaft 3 and agitator S are rotated, and at 5 is a glass tube or gage by which the contents of the vessel B can be ascertained, and A is a still of any suitable character, preferably vertical, provided with a pipe and cock K, leading from the vessel B, by which the liquid can be run into the still A and pass into the upper pan of a series of pans F, that surround the vertical heating-pipe E, within which is a supply-pipe F' for steam or other heating-fluid, and at the bottom of the still a pipe J may be connected to the supply-pipe F', so that either live steam from a boiler or exhaust-steam from an engine may be run into a heating-pipe E and the water of condensation can be taken off by a larger pipe around the pipe F' to the pipe and cock H. The pans F are to be of suitable size surrounding the heating-pipe E and extending nearly to the inner surface of the still A, and these pans are shallow and are applied to the entire length of the heating-pipe E, and at the bottom of the still A a pipe G and cock are provided for running away the refuse liquid.

In operating my apparatus the saturated solution of ammonia-salt is introduced in the vessel D and a saturated solution of alkali—such as caustic soda—is introduced into the vessel C, and then the cock in the pipe C' is opened and a proper proportion of the alkaline solution—say one-third—is introduced into the vessel B, and then the cock in C' is closed and the cock in the pipe D' opened to admit twice the amount of sulphate of ammonia into the vessel B, and the agitator S is put into action to mix the materials together, and the cock P in the pipe T is opened for allowing gases that are generated to pass into the still A, and thereby maintain uniformity of pressure in the still A and vessel B, and the cock R is opened to allow the anhydrous ammonia to pass to the refrigerating apparatus. Steam is admitted into the pipe F' to heat the apparatus to the desired temperature, and the liquid is allowed to run from the vessel B by the pipe and cock K into the upper pan F, and from that to overflow into the respective pans and gradually pass to the bottom of the still. The heat drives off from the liquid solution the gaseous ammonia, so that the liquid reaching the bottom of the still is free from the same and the liquid passes away as a sulphate of soda or its equivalent, and by observing from time to time whether there is any odor in the escaping liquid the attendant can regulate the supply by the cock K, so that the liquid will remain in the still A a sufficient length of time for the ammonia to be driven out from the same. By this means the anhydrous ammonia can be manufactured from time to time, as required, for the refrigerating apparatus, and the solutions in the vessels C and D can remain therein until required for use.

It is generally preferable to provide a vent-pipe and cock L, passing from the top of the vessel A into the vessel D to equalize the pressure in the two vessels.

I do not limit myself to the vessel B and agitator S for mixing the respective solutions in the proper proportions, as a pump may be provided for the purpose of drawing the solutions in the proper proportions, mixing them together, and supplying them into the still.

I claim as my invention—

1. The combination, with vessels for containing solutions of ammoniacal salts and of alkali, respectively, with a mixing apparatus, of a still into which the liquid is passed, a heating device for the same, and a pipe leading to the refrigerating apparatus for conveying to the same the anhydrous ammonia evolved, substantially as set forth.

2. The combination, with the vessels C and D and their pipes and cocks, of the vessel B, a gage-glass upon the same, an agitator within such vessel, the still A, the heating-pipe E within the same, the range of pans F, a supply-pipe and cock K, a steam-pipe F', pipe R, leading to the refrigerating apparatus, and the pipe and cock G for the spent liquid, substantially as set forth.

Signed by me this 16th day of March, 1891.
DANIEL L. HOLDEN.

Witnesses:
GEO. T. PINCKNEY,
WILLIAM G. MOTT.